4 Sheets—Sheet 1.

R. M. HOE & S. D. TUCKER,

Assignors to R. HOE & Co.

Printing-Machine.

No. 8,801. Reissued July 15, 1879

Witnesses:
E. B. Stocking
S. B. Roane

Inventor
Hoe and Tucker
by Munson & Philipp
attys.

R. M. HOE & S. D. TUCKER,

Assignors to R. HOE & Co.

Printing-Machine.

No. 8,801. Reissued July 15, 1879.

Witnesses:
E. B. Stocking
S. B. Roane

Inventors:
R. M. Hoe and S. D. Tucker
by Munson & Philipp
attys.

4 Sheets—Sheet 3

R. M. HOE & S. D. TUCKER,

Assignors to R. HOE & Co.

Printing-Machine.

No. 8,801. Reissued July 15, 1879.

Witnesses:
E. B. Stocking
S. B. Roane

Inventors:
Hoe and Tucker
by Munson & Philipp

4 Sheets—Sheet 4.

R. M. HOE & S. D. TUCKER,

Assignors to R. HOE & Co.

Printing-Machine.

No. 8,801. Reissued July 15, 1879.

Witnesses:
E. B. Stocking
S. B. Roane

Inventors:
Hoe and Tucker
by Munson & Philipp
attys.

UNITED STATES PATENT OFFICE.

RICHARD M. HOE AND STEPHEN D. TUCKER, OF NEW YORK, N. Y., ASSIGNORS TO R. HOE & CO.

IMPROVEMENT IN PRINTING-MACHINES.

Specification forming part of Letters Patent No. 84,627, dated December 1, 1868; Reissue No. 4,400, dated May 30, 1871; Reissue No. 8,801, dated July 15, 1879; application filed February 17, 1879.

*To all whom it may concern:*

Be it known that we, RICHARD M. HOE and STEPHEN D. TUCKER, of the city, county, and State of New York, have invented certain Improvements in Printing-Machines, of which the following is a specification.

This invention consists, mainly, in a mechanism whereby sheets are successively carried onward for delivery, with which co-operate automatically-moved switches, that operate to direct alternate sheets conveyed within their range of action into separate conducting-channels. It also embraces the combination, with said vibrating switches, of cylinders constructed of separate pulleys placed on a common shaft. It includes a type cylinder provided with longitudinal and transverse grooves, in which slide clamp-blocks, which are secured to counter clamp-blocks that engage with and hold the printing-plates; and said invention further comprehends combinations of devices, as will be particularly hereinafter set forth and claimed.

Figure 1:
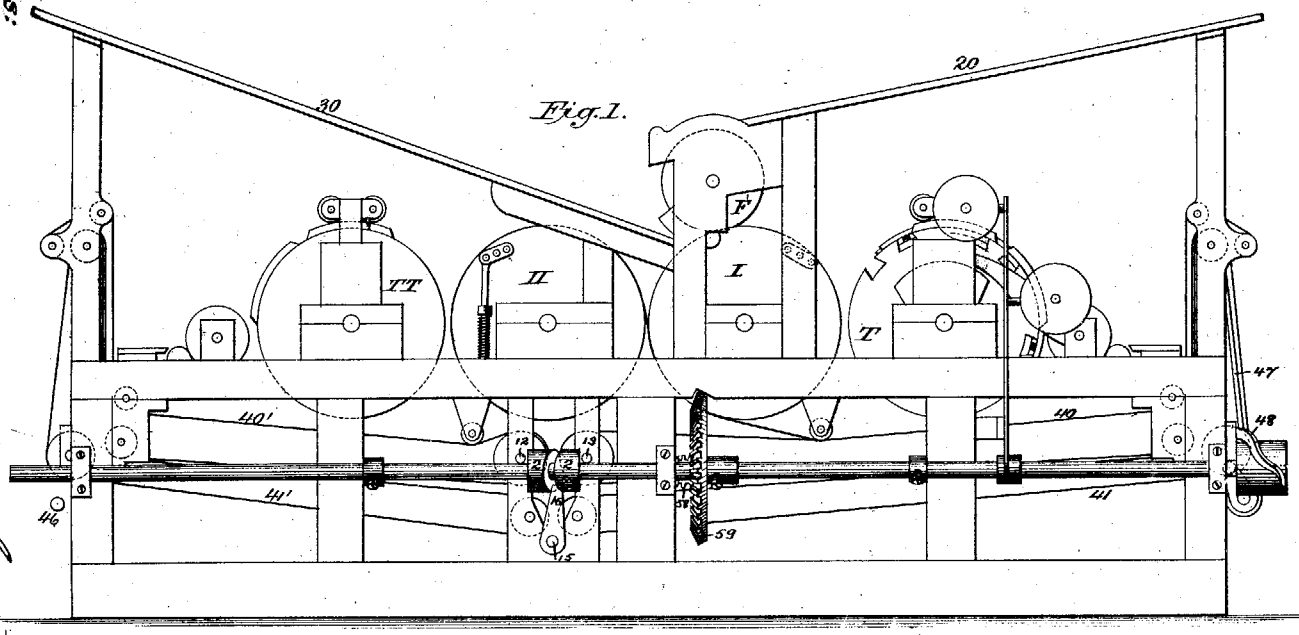
Figure 2:
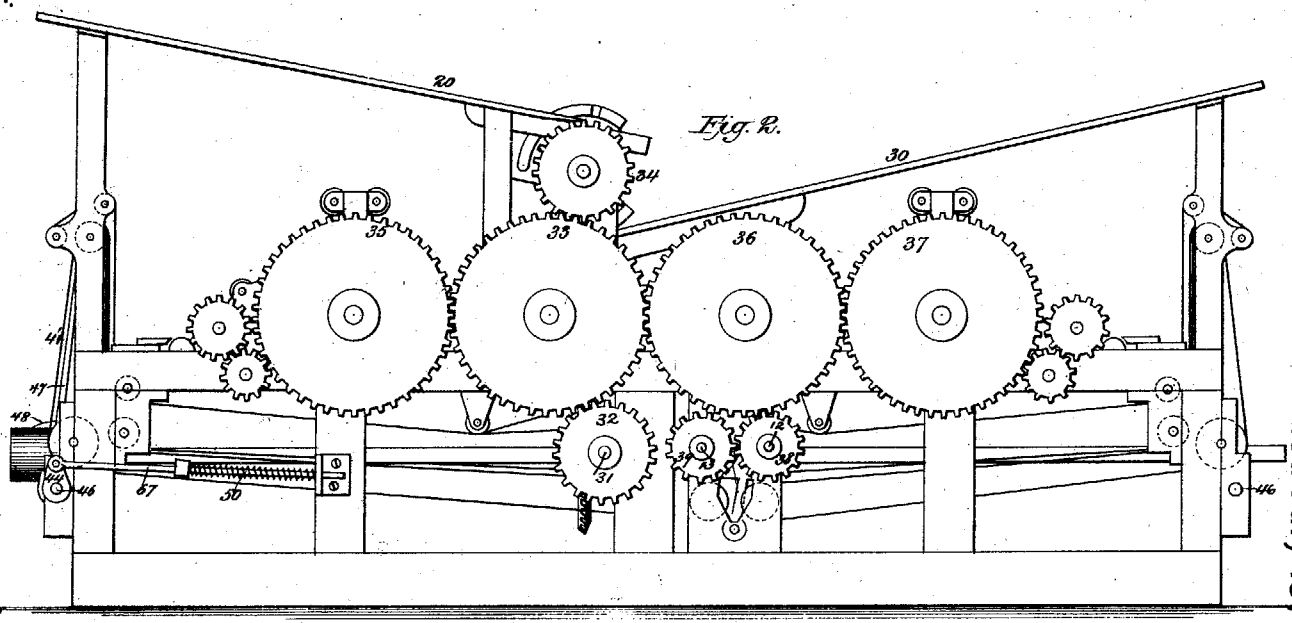
Figure 3:
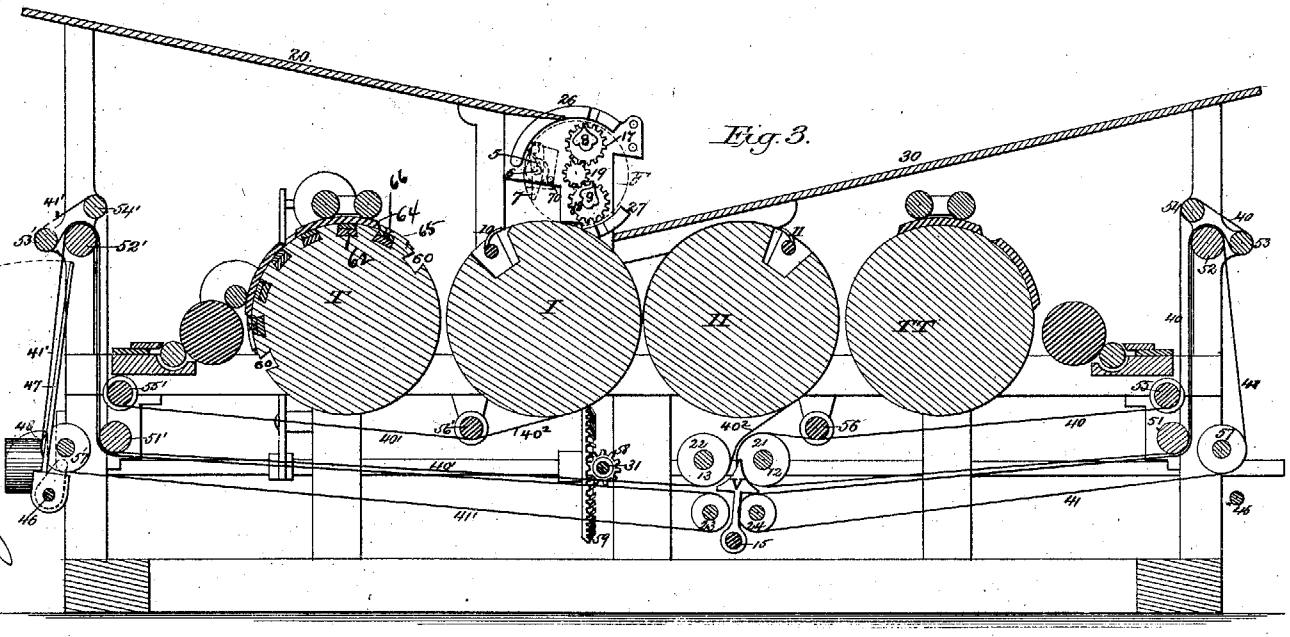
Figure 4:
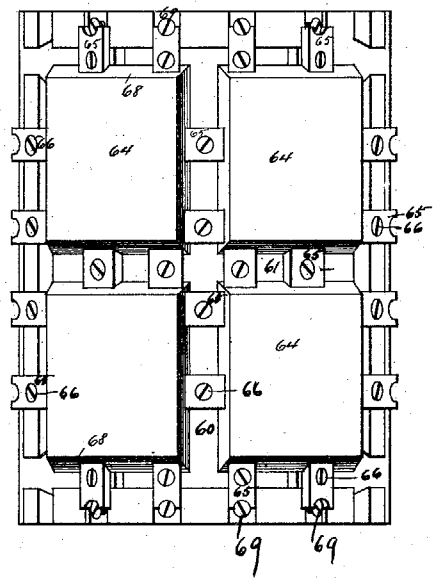
Figure 5:
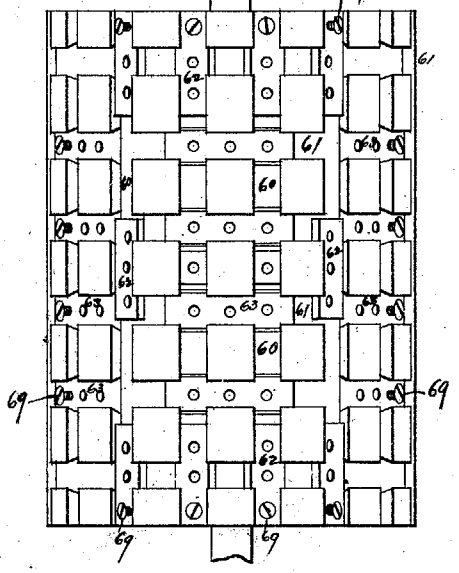

Figure 1 represents one side elevation of the machine, and Fig. 2 the opposite side elevation of the same. Fig. 3 represents a longitudinal vertical section taken in planes parallel with the plane of Figs. 1 and 2, and showing, in side elevation, the mechanism beyond the feeding-in cylinder. Fig. 4 represents a plan view of one of the type-cylinders with the stereotype-plates secured to it; and Fig. 5 is a like view with the stereotype-plates removed.

Similar letters of reference indicate like parts in the several figures in which they occur.

We will first describe the construction and operation of the first part of said invention.

In Figs. 1, 2, and 3 of the drawings, 20 and 30 represent inclined feeding-tables, on which the sheets of paper are to be placed, and from which they are successively fed by operatives to the feeding-in cylinder F. The lower end of the upper feeding-table, 20, is just above, and that of the table 30 just below, the feeding-in cylinder F. These tables are to be provided with the usual means to enable the operative to present the lower edge of each sheet in the proper place to be taken by the gripers or fingers.

The feeding-in cylinder F is of the usual construction, with gripers or fingers to seize and carry forward the sheets; and it receives motion from the main shaft 31 by the train of cog-wheels 32 33 34. It is provided in the usual manner with griping-fingers 5, projecting from a shaft, 6, mounted in a recess made in the cylinder F for that purpose, and one end of the said griper-shaft projects beyond one end of said cylinder, and is provided with a rock-arm and crank-pin, 7, which rock-arm, actuated by mechanisms mounted in the side frame, rocks said shaft and turns the griping-fingers in one direction to gripe the edge of a sheet of paper against the surface of the cylinder, and then in the opposite direction to liberate the sheet. These griper-operating mechanisms are in their separate elements of the usual and well-known construction heretofore used; but that part of them for closing the fingers is duplicated, the same consisting of two revolving cams, 8 9, whose pinions 17 18 are geared together and driven by an intermediate pinion, 19, that is fast on the shaft of the cylinder F, which cams co-operate with fixed cams 26 27, fastened to the side frame. One set or part of this griper mechanism is arranged above and the other below the shaft of the feeding-in cylinder F—one set to operate the fingers for taking the sheets from one and the other for taking the sheets from the other feeding-table. Said pinions are opened to release the sheets to be carried onto the impression-cylinder I by a fixed stud, 70.

The machine being in operation, a sheet of paper on the feeding-table 20 is moved down by the operative to the proper gage, so that its lower edge will be in the required position to be griped by the fingers 5 of the feeding-in cylinder. So soon as it is griped the sheet is carried around and presented to the impression-cylinder I, which is on the shaft of the cog-wheel 33, and receives motion from the main shaft by the cog-wheel 32. This cylinder is provided, as in the usual manner, with griping-fingers 10, operated in the usual manner, which gripe the same edge of the sheet as it is liberated by the griping-fingers of the feeding-in cylinder.

The sheet of paper thus transferred is carried around with the cylinder I and presented to the type-cylinder T, and receives the required imas it is liberated by the griping-fingers of the feeding-in cylinder.

The sheet of paper thus transferred is carried around with the cylinder I and presented to the type-cylinder T, and receives the required impression on one surface, and while it is being so printed it continues to be held to the surface of the impression-cylinder I until the selfsame edge is carried up, presented to, and griped upon the surface of the impression-cylinder I I by its griping-fingers 11 at the same time that it is liberated by the griping-fingers 10 of the impression-cylinder I.

The impression-cylinder I I is constructed in all respects like the cylinder I, and is provided, in like manner, with griping-fingers. It is turned with equal velocity, but in the reverse direction, by the cog-wheel 36 on its shaft, which receives motion from the cog-wheel 33 on the shaft of the impression-cylinder I.

The tail end of the sheet of paper, which is not griped, is held up by tapes against the under side of the impression-cylinder I as it is passing to the cylinder I I. These tapes will hereinafter be described.

The sheet of paper, by being thus transferred from impression-cylinder I to I I, is reversed, so that the surface which has been printed is in contact with the surface of impression-cylinder I I, and its unprinted surface outside, and that is, in succession, presented to and printed by the type-cylinder T T.

The type-cylinder T receives motion from the impression-cylinder I by cog-wheels 33 and 35, and the type-cylinder T T from impression-cylinder I I by the cog-wheels 36 and 37. The surfaces of all four of these cylinders travel at the same speed and in the direction indicated by the arrows in Fig. 3.

After the sheet of paper has been printed on the second surface by the type-cylinder T T it is to be carried off and delivered, which operation will be presently described.

While the first sheet of paper is being printed on one side, and delivered by the impression-cylinder I to the impression-cylinder I I, as above described, a second sheet of paper is presented from the feeding-table 30, as described with reference to the first sheet on the feeding-table 20, so that at the next operation the griping-fingers 5 of the feeding-in cylinder, instead of being operated when opposite the lower end of the feeding-table 20, are operated when they come opposite the lower edge of the feed-table 30, from which they take the second sheet, which is in turn presented to and taken by the fingers of the impression-cylinder I at the beginning of the second revolution of that cylinder, carried around to be printed on one surface by the type-cylinder T, presented to the impression-cylinder I I, and the reverse side presented by it to the type-cylinder T T, to be printed and then delivered, as before.

In the manner above described the sheets of paper are taken alternately from the feeding-tables by the same feeding-in mechanism, so that the machinery can be carried at the desired velocity to print sheets on both sides as fast as the said sheets can be presented by operatives from the two feeding-tables 20 30.

The type-cylinders are to be provided with the usual or other suitable inking apparatus, not necessary to be described.

The sheets of paper will be delivered from such a printing-machine too rapidly to be laid in one pile by the mechanism usually employed for that purpose, and known as the "fly," as such mechanism has been heretofore applied.

We will now describe the second part of said invention.

Referring to the drawings, 12 and 13 represent two parallel shafts, which are rotated in opposite directions by pinions 38 and 39 on their outer ends, the one, 38, receiving motion from the cog-wheel 36 on the shaft of the impression-cylinder I I. These two shafts each carry a delivering-cylinder, composed of a series of pulleys or rollers, 21 and 22, separated a distance apart to allow vibrating guiding-switches V to play between them.

A series of tapes, 40, passes around the cylinder 21 on the shaft 12. From the under side of the cylinder 21 these tapes pass under a guide-roller, 51, at one end of the frame, and thence upward over a second guide-roller, 52, near the top of the frame; thence under and around a third guide-roller, 53, to and over a fourth guide-roller, 54, just above and a little back of the roller 53, before described; thence under a roller, 55; then back to the cylinder 21, passing under a sixth guide-roller, 56, near the cylinder 21.

Just below the cylinder 21 there is a corresponding range of pulleys, 24, on a loose shaft, and these pulleys carry another series of tapes, 41, which pass from the top of the pulleys 24 to and under the tapes 40, where they pass under the guide-roller 51, thence up over the guide-roller 52, down to and under a series of pulleys, 57, back to the series of pulleys 24.

A sheet of paper being delivered to the two series of tapes 40 and 41 between the cylinder 21 and pulleys 24 will be carried along in nearly a horizontal direction between the said two series of tapes to and under the guide-roller 51, thence nearly in a vertical direction to and over the guide-roller 52, over to the front of this roller, when the series of tapes 40 leaves it to return, and it will then descend in nearly a vertical direction in front of the series of tapes 41 and in front of the fly-frame, so that at the instant the upper or tail end of the sheet is liberated in front by the series of tapes 40 said sheet can be thrown down upon the pile by the fly-frame.

At the other end of the frame there is a like arrangement of pulleys, tapes, and guide-rollers to carry and deliver sheets of paper in the opposite direction. These corresponding duplicate parts are indicated on the drawings by corresponding reference-characters, which are primed to designate them from the parts above described.

Some of the series of tapes, marked $40^1$, on this end of the machine, instead of being arranged as the others of the series, or like the tapes 40 at the end of the machine, already described, are made of greater length, and pass from the sixth guide-roller, 56′, under and around a portion of the impression-cylinder I to hold up the sheets of paper and prevent them from falling from the impression-cylinder before being effectually transferred.

From this cylinder they pass over and around the impression-cylinder I I, and thence down to the cylinder 21 on shaft 13, before described. These tapes of the series $40^1$ are marked $40^2$ to distinguish them from the rest of the series. Where they pass around the impression-cylinder I they are outside of the sheet of paper which may be passing through the machine; but where they pass around the impression-cylinder I I they are between the sheet of paper and the surface of the cylinder, so that they guide the end of the sheet of paper, after it has been printed, to the space between the two cylinders 21 and 22 on the shafts 12 and 13; and as the sheets of paper are to be delivered alternately in opposite directions when they enter the space between the cylinders 21 and 22 to be carried to one end between the two series of tapes 40 and 41, or to the opposite end between the two series $40^1$ and 41′, the ends of the sheets are to be directed alternately in opposite directions. For this purpose there is a horizontal rock-shaft, 15, just below the shafts 12 and 13, and in a plane perpendicularly between them.

From this shaft projects upward a series of guiding-switches, V, which play in the spaces between the separated pulleys or rollers constituting the cylinders 21 and 22, and regulate the direction given to the end of the sheet passing over the cylinder 21, preventing the sheet from following around the periphery of the cylinder 21, or causing it to so travel according as the said guiding-switches are vibrated in one or in the opposite direction, which movement of them is accomplished as follows:

On the other end of the shaft 15 there is an arm, 16, the upper end of which runs in a grooved cam, 2, fast on a longitudinal shaft, 25, which receives motion from the main shaft 31 by a bevel-pinion, 58, and bevel-wheel 59, so proportioned as to give to the longitudinal shaft 25 half a revolution to one of the impression-cylinders, the cam-groove being so formed as to vibrate the guide-fingers to one side for one revolution of the impression-cylinder, and in the opposite direction for the next revolution.

The upper ends of the guiding-switches are spear-shaped, so that when thrown in one direction between the separate pulleys constituting the cylinder of the series 21 they will form guides to direct the sheet of paper between the two series of tapes $40^1$ and 41′, and when vibrated in the opposite direction they will guide the sheet of paper to and between the two series of tapes 40 and 41. In this way the sheets of the paper are taken and alternately delivered in opposite directions, so as to be separated, which sheets may be delivered in two piles alternately on one and then on the other side, either by two separate fly-frames, or, as the equivalent thereof, a double-acting fly-frame.

At each end of the frame there is a rock-shaft, 46, provided with a series of parallel rods, which constitute the fly-frame 47. Both of these shafts are represented in the accompanying drawings; but only one of the fly-frames and appendages is represented, as one is but the repetition of the other.

When at rest the rods of the fly-frames are in a nearly vertical position, and a little back of the series of tapes 41 or 41′, where these are nearly in a vertical position, and as soon as the sheet of paper is liberated by the series of tapes 40 or $40^1$ it is struck by the rods of the fly-frame 47 and thrown down in a pile.

The fly-frame is drawn up by a cam, 48, on the end of the longitudinal shaft 25, which acts on a rock-arm, 49, on one end of the rock-shaft 46, the cam being so formed as to hold up the fly after lifting it, and until a sheet is to be delivered, and then the cam passes the arm 48, and permits the fly to be thrown down by a spring, 50, on a rod, 67, which is connected with a crank-pin of arm 44 on the end of the rock-shaft 46. The cams at the two opposite ends of the shaft 25 are to be so placed that they will alternate the operations of the two fly-frames.

We will now describe the third part of our invention.

Referring to the drawings, Figs. 3, 4, and 5, longitudinal and transverse grooves 60 and 61 are formed in the periphery of the printing-cylinders. These grooves are dovetailed, and in them are fitted counter clamp-blocks 62 63, so as to slide therein. The stereotype or other printing-plates 64, curved so that their inner surfaces will fit the periphery of the printing-cylinders, are formed with their outer edges beveled from the outside of the printing-surface, as represented at 68. The plates so prepared are placed in their required positions on the periphery of the printing-cylinder, and there clamped by outer clamping-blocks, 65, by means of screws 66, which pass through the outer clamping-blocks, and which are tapped into the inner clamping-blocks, 62 and 63. The outer clamping-blocks at the outer edges of the outer plates are prevented from yielding outward when clamping the beveled edge of the plates by screws 69, which are tapped into the counter clamping-blocks and bear against the cylinder, and their heads are fitted to semicircular recesses in the outer edges of the clamping-blocks. As the two series of counter clamping-blocks are fitted to slide in the two series of grooves, which are at right angles to each other, and the outer clamping-blocks are fastened to these, it follows that they can be adjusted in position to clamp plates of any size directly to the surface of the cylinder, for when the outer and the counter clamping-blocks are drawn together by the screw the outer blocks are drawn to the counter-blocks and to the outer beveled faces of the edges of the plates, thereby drawing these plates directly to the surface of the cylinder.

Having thus fully described the novel features and characteristics of said invention, what we claim is—

1. The combination, with a sheet-conducting mechanism, whereby sheets are successively carried onward for delivery, of automatically-moved switches that operate to separate alternate sheets and direct them into separate conveying-channels, all substantially as described.

2. The combination, with the vibrating switches V, of a single sheet-conducting channel, from which the sheets are received by said switches, and two sheet-discharging channels, into which said sheets are alternately directed by said switches, substantially as described.

3. The combination, with a sheet-conducting mechanism, of vibrating sheet-guiding switches, by the conjoint operation of which sheets are successively conducted to the point occupied by the switches and alternately guided in different directions, all substantially as described.

4. The means for securing the stereotype-plates upon the type-cylinder, the same consisting of dovetailed grooves cut both longitudinally and transversely in said type-cylinder, in which grooves slide counter clamp-blocks, to which are secured the outer clamping-blocks, all substantially as described.

5. The combination, with the cylinders 21 22, each composed of separate pulleys or rollers placed on a common shaft at suitable distances apart, of the vibrating switches V, substantially as described.

In testimony whereof we have hereunto signed our names this 15th day of February, 1879.

RICHD. M. HOE.
STEPHEN D. TUCKER.

Witnesses:
CHAS. W. CARPENTER,
FRANKLIN T. GROSS.